July 3, 1962 S. H. NORTON 3,041,715
METHOD OF MAKING VALVE SPRING RETAINER LOCKS
Filed April 18, 1958 2 Sheets-Sheet 2
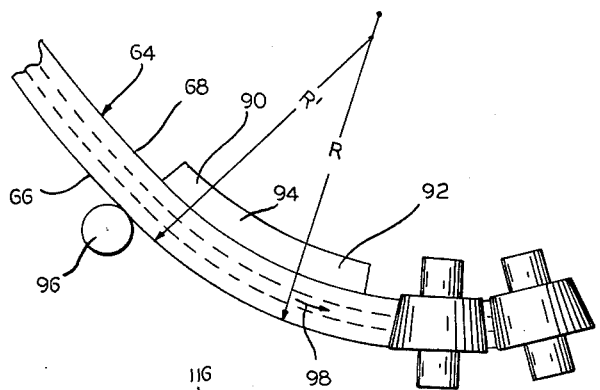
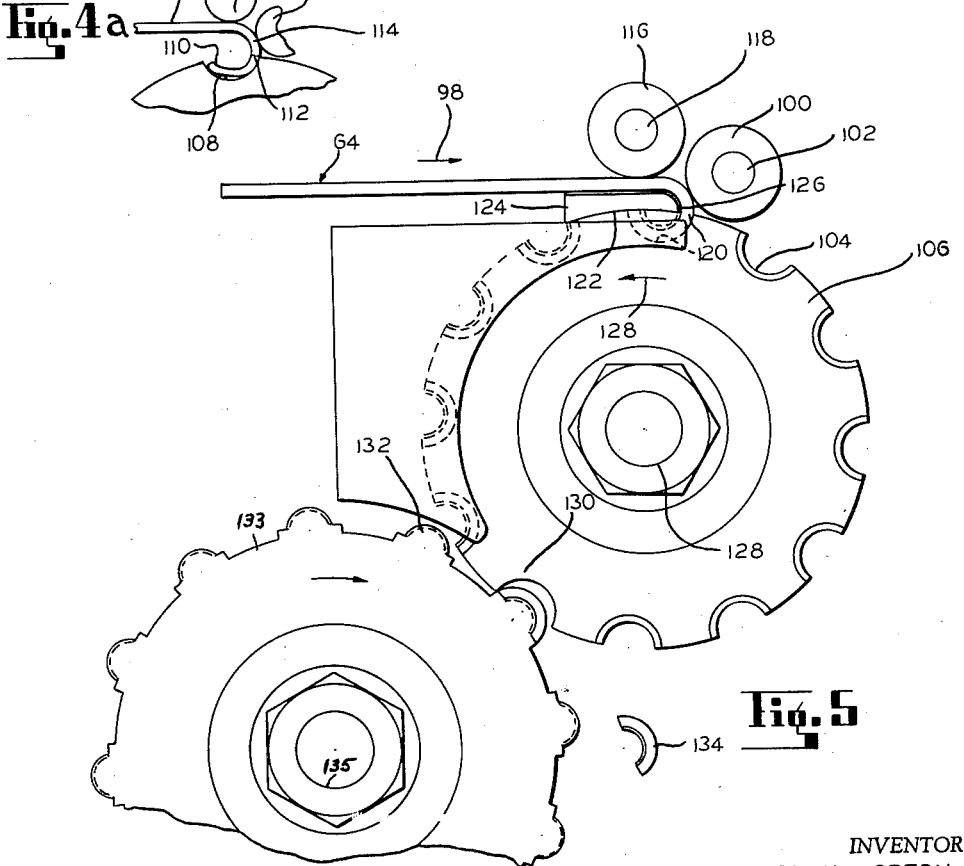
INVENTOR.
SAMUEL H. NORTON
BY
ATTORNEYS July 3, 1962 S. H. NORTON 3,041,715
METHOD OF MAKING VALVE SPRING RETAINER LOCKS
Filed April 18, 1958 2 Sheets-Sheet 1
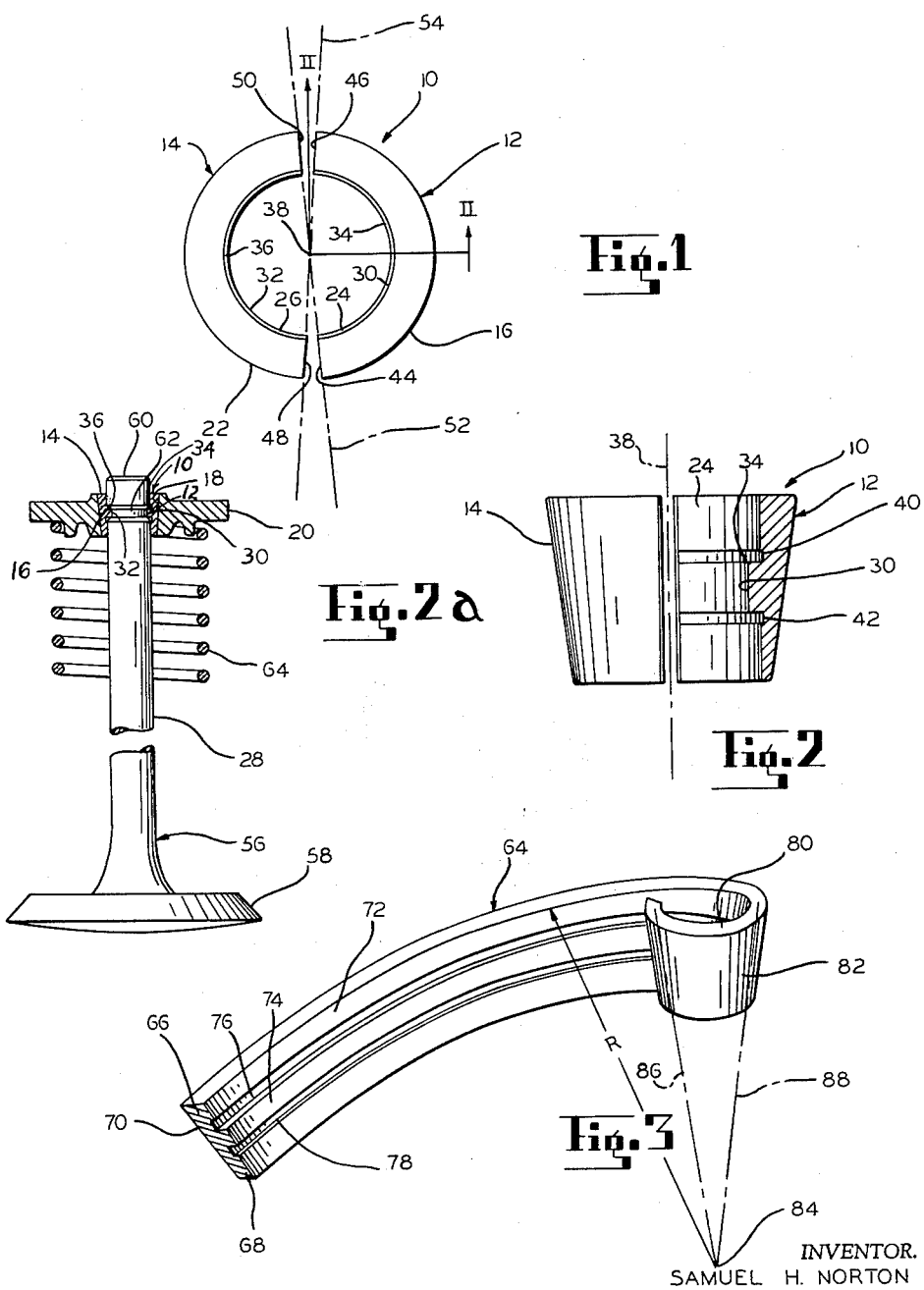
INVENTOR.
SAMUEL H. NORTON
ATTORNEYS

# United States Patent Office 3,041,715
Patented July 3, 1962

3,041,715
METHOD OF MAKING VALVE SPRING
RETAINER LOCKS
Samuel H. Norton, University Heights, Ohio, assignor to Thompson Ramo Wooldridge Inc., a corporation of Ohio
Filed Apr. 18, 1958, Ser. No. 729,338
10 Claims. (Cl. 29—417)

The present invention relates to valve spring retainer locks or valve stem collars, as used on poppet valves for internal combustion engines, and more specifically to an improved method of making the retainer locks.

Locks of the type to which the invention relates are generally formed of metal and in substantially semi-cylindrical form with two opposed locks being used to form a complete collar on a valve stem for retaining and locking a spring retaining plate against axial movement, so as to permit the valve spring to act on the valve. The spring retaining or abutment plate normally is disposed about the stem portion of the valve, with the stem portion being cylindrical in shape and formed with an annular groove, and with the abutment plate having a downwardly flaring conical bore. The valve locks have an inner substantially cylindrical surface to fit to the outer surface of the valve stem and have an annular bead therein to enter the groove in the stem for holding the locks against axial movement along the stem. The outer surface of the locks is generally shaped to lie in a conical plane to conform to and be in engagement with the conical bore in the retainer plate.

Another feature of the invention is the provision of an improved process having advantages over processes heretofore used and obtaining an improved lock structure.

In commercial processes heretofore used for manufacturing locks, a tapered flat strip of lock material was provided and retainer locks formed from the material by pressing a segment of the strip over a shaped die having a concave surface by a punch or die having a convex surface. The die with the convex surface heretofore had two protruding punch surfaces which engaged the metal and forced it over the curved convex die. An example of this process is shown in Patent 2,053,206, Kelleher. In this manner of forming the lock, the material between the two dies is bent at its weakest point midway between the projections of the concave die, and this bend formed a very sharp kink, which remained in the finished piece to provide a depression in the inner cylindrical surface of the finished lock.

In processes heretofore used, the cone-shaped locks were made out of a flat or straight sided material. The concave die was provided with a conical cavity and as the material was forced against the convex die, the outer ends of the lock and the outer ends of the bead within the lock ncessarily turned or flared upwardly toward the thicker end of the lock in order to produce the resultant cone with the displacement of the metal material. This distorted the upper surface of the bead, so that the bead did not engage the edge of the valve stem groove in surface engagement, but only in point contact at the ends of the bead. Therefore, complete locking did not occur until the bead was worn enough to give the groove in the valve stem a flat bearing against the bead. During the wearing time, the lock moved up on the valve stem and changed the operating length of the valve spring.

In methods heretofore used, as the edges of the concave die pushed the lock downwardly and the metal bent with a sharp kink in the center, the outer edges of the concave die dug into the surface of the metal and scraped out a portion of both sides of the lock. This scraped out portion left a cavity in the surface of the finished lock and bearing surface was lost in the outer edges and also tended to split and ruin some of the retainer plates or collars. Further, the gouged out space permitted the passage of oil past the locks at this point, which was undesirable.

In certain methods heretofore used, such as those above described, when the lock was pressed between the dies, cut-off knives moved inwardly to remove the excess of material and complete the lock. This created a burr on the inner surface of the lock which was increased in size as the cutting dies became worn. These burrs finished as a rounded hump along the edge of the lock preventing proper seating on the valve stem.

The cut-off knives moved inwardly in a plane positioned inwardly from the radial center of the lock in order to move in opposing directions, and form a lock which had an arcuate surface slightly less than a complete semi-circle. When two locks were assembled on a valve stem to form a collar, the cut ends formed a groove with parallel sides so that when either lock was rotated to close the grooves, the ends met in line engagement rather than in surface engagement. The line engagement was at the outer surface of the locks, and thus the locks are deprived of some of the inner bearing surface of the valve stem.

A factor which made the use of the above and similar methods necessary was the impossibility of bending the very end of a length of material to a smooth arcuate surface. It was, therefore, necessary to bend an excess amount of material and cut off the ends. This resulted in certain of the above difficulties and wasted a substantial amount of the original piece of material.

It is an important object of the present invention to provide an improved method of forming valve spring retainer locks which avoids the above disadvantages and obtains a valve lock structure which does not have the defects inherent in methods heretofore used.

Another object of the invention is to provide an improved method of forming valve locks wherein the method eliminates the necessity of bending a strip of material from the end to form a lock and thereby avoids much of the difficulty and the disadvantages inherent with methods heretofore used, such as the one above described.

A further object of the invention is to provide a method for forming valve locks wherein a tapered flat strip of material is used, and the material is edge-bent in the plane of the strip of material and then bent into lock form to avoid the necessity of axially displacing material by squeezing the lock into shape to form a conical outer surface.

Another object of the invention is to provide an improved method for forming valve locks wherein ends of waste material are not created each time an individual lock is formed.

A still further object of the invention is to provide an improved manufacturing method for making valve locks wherein the locks do not have burrs at the inner surfaces, do not have gouges at their outer conical surface, do not have vertical channels due to kinking of the material, and have an inner annular bead with a surface lying completely in a plane extending at right angles to the axis of the lock.

Other objects, features and advantages will become more apparent with the teachings of the principles of the invention in connection with the description and showing of the preferred embodiment thereof, in the specification, drawings and claims, in which:

FIGURE 1 is a plan view taken from the top or large end of a valve spring retainer collar formed of locks embodying the principles of the present invention;

FIGURE 2 is a sectional view taken substantially along line II—II of FIGURE 1;

FIGURE 2a is a vertical sectional view taken through an assembled valve mechanism;

FIGURE 3 is a perspective view of a strip of material for making valve locks especially illustrating the radius of curvature for edge-bending;

FIGURE 4 is a plan view illustrating steps in the method of forming valve locks;

FIGURE 4a is a fragmentary elevational view illustrating the forming of the lead end of a strip of material; and FIGURE 5 is an elevational view illustrating steps in the forming of valve locks.

As shown in the drawings:

A valve lock of the improved structure of the present invention is illustrated in FIGURES 1 and 2. The valve lock is shown assembled to form a collar for holding a spring retainer plate, with the collar formed of two locks or two segments. As illustrated in FIGURES 1, 2 and 3, a valve collar 10 is formed of locks 12 and 14. Each of the locks 12 and 14 has an outer arcuate surface 16 and 22 which lies completely within a conical plane. The plane may be of any chosen angle, but is preferably of the angle of the inner bored surface 18 of a spring retainer plate or washer 20.

The locks 12 and 14 have inner surfaces 24 and 26 which lie in a cylindrical plane of substantially the diameter of the outer surface of a valve stem 28. The locks 12 and 14, made by the method of the present invention, each have a valve stem contacting surface which is unbroken and which lies wholly and completely within the cylindrical plane.

Extending inwardly from the inner concave cylindrical surfaces 24 and 26 of the locks are segmental annular beads 30 and 32. The beads project radially inwardly and have upper surfaces 34 and 36 which lie wholly and fully on a plane which is at right angles to the central axis of the beads which coincides with the axis of the curvature of the inner and outer surfaces of the locks, and which is shown at 38. Above and below the bead is formed a shallow annular groove or depression 40 and 42 which extends slightly into the annular surface 24 of the lock 12, as shown in FIGURE 2. The locks end in vertical flat surfaces with surfaces 44 and 46 being shown at the ends of the lock 12 and surfaces 48 and 50 being shown at the ends of the lock 14. In assembled form to complete the collar 10, surfaces 44 and 48 of the lock are in facing relationship, and 46 and 50 are in facing relationship.

A feature of the invention resides in the structure wherein each of the end surfaces of the locks lies in a radial plane which passes through the axial center of the locks. The surface 44, for example, of the lock 12 lies in a radial plane 52, which passes through the axial center 38 of the lock. The other end surface 46 of the lock 12 also lies in a radial plane shown at 54 with the plane also passing through the axial center 38 of the bead. The ends 48 and 50 of the lock 14 also lie in radial planes and are illustrated in the planes 52 and 54. This obtains maximum surface engagement between the inner arcuate or cylindrical surface 24 and the inner or arcuate surface 26 of the locks and the valve stem. When the locks shift on the valve stem to where their end surfaces meet the surfaces will meet in coplanar surface engagement. In lock structures heretofore used, the end surfaces were usually cut in a common plane for each lock with the plane passing inside of the radial center of the lock. Thus when the locks were shifted, they met the other lock of the collar assembly in line engagement. This deprived the collar assembly of the full amount of surface engagement with the outer surface of the valve stem. The relationship between the lock and valve stem may be illustrated with reference to FIGURE 2a.

FIGURE 2a illustrates a valve 56 having a head portion 58 and a stem portion 28. The stem 28 has an outer cylindrical surface and near the upper end 60 is an annular groove 62. This groove coacts with the bead on valve locks to prevent axial displacement of the locks along the stem surface.

Surrounding the stem is a coil compression spring 64 which bears on a surface of an engine, not shown, to provide a backing for the spring. The spring seats at its upper end against the lower surface of a spring retainer plate or washer 20. The plate 20 is locked to the valve stem by the collar 10 so that forces of the spring 64 will urge the valve 56 upwardly to move the valve head 58 against a valve seat, not shown.

The valve retainer plate 20 has an inner upwardly outwardly flaring surface 18 which is conical in shape. This surface mates with the outer surface 12 and 22 of the valve locks 12 and 14 to prevent upward movement of the retainer plate 20. The upper surfaces 34 and 36 of the beads of the valve retainer locks engage the shoulder at the upper side of the groove 62 in the valve stem.

It will be seen that with the construction of the present valve locks, complete surface engagement is obtained between the inner surfaces 24 and 26 of the valve locks and the outer cylindrical surface of the valve stem 28. Further, the lack of burrs at the ends of the inner surfaces insure complete surface engagement.

Also complete surface engagement is obtained between the upper surfaces 34 and 36 of the beads 30 and 32 of the locks 12 and 14 with the upper shoulder formed by the groove 62. This prevents rocking of the locks and insures immediate positioning of the retainer plate 20. Also, the outer surfaces 16 and 22 of the locks 12 and 14 will meet in perfect surface engagement with the surface 18 of the retainer 20.

For the description of the method of making locks of the present invention, reference may be made to FIGURES 3 through 5. The locks are formed from a substantially flat strip of lock material 64 which is of a deformable nature, such as metal. The flat strip of material is tapered so that its upper edge 66, as illustrated in FIGURE 3, is thicker than the lower edge 68. The lower surface 70 is flat whereas the upper surface 72 has vertical ridge 74 in the center which later forms the beads for the individual valve locks. At each side of the ridge 74 is a shallow groove, as shown at 76 and 78.

In the method of forming the locks, the flat strip of material 64 is first edge-bent.

As illustrated in FIGURE 4, the edge-bending is performed on the material, and the thinner edge 68 is formed at the inward side of the edge-bent material while the thicker edge 66 is at the outward side of the curved edge-bent material. The curvature of edge-bending is preferably about a radius R which is equal to the distance from the outer or upper edge 80 of a formed cone 82, as shown in FIGURE 3, to the intersection 84 of two lines 86 and 88 which bisect the material on each side of the cone shaped lock 82. This obtains the radius R.

In the first step of edge-bending, the material is bent to a somewhat sharper radius R', than the desired radius R. This is illustrated in FIGURE 4. This over-bending accommodates the spring in the material, and as the material is fed forward from the location 90, where it is over-bent, to the location 92, it is permitted to spring outwardly to the desired radius R.

Bending may be accomplished by suitable means such as against a radius bar 94, with the metal being held by a roller 96.

As illustrated in FIGURES 4 and 5, the edge-bent material is fed forwardly in the direction of the arrows 98.

In the first direction of the strip 64 into the machine, the end will engage a deflecting roller 100 which is mounted for free rotation on a hub 102. The deflecting roller will deflect the end downwardly into one of the concave arcuate die pockets or recesses 104 in a die wheel 106. The die recess 104 has an outwardly facing surface lying in a conical plane in order to bend the end of the strip 64 into a lock with the inner surface of the lock being substantially cylindrical.

In starting the strip 64, as illustrated in FIGURE 4a, the strip may be fed forwardly to engage the deflecting roller 100, and curls downwardly into a die pocket 108. The leading end 110, will not curl completely to the end but serves to curl the material behind it. After the leading end is bent sufficiently to form a curl of the proper arc behind it, it is severed at the point 112, and the first severed end is discarded.

The first cut 112, and each of the succeeding cuts, are formed leaving the bent end 114 on the leading end of the material and this bent leading end will form the leading end of each successive lock.

With the formation of each lock, the strip 64 is moved forward in an increment equal to the length of the lock. The material is guided downwardly by the deflector roller 100, and held into the curved concave die surface by a backing roller 116, mounted for free rotation on a shaft 118. When the material is curled into the die, as illustrated by the die opening 120, it will reach an under surface 122 of a guide 124 that has a leading cutting edge 126. The cutting edge will sever the lock from the end of the material, and this severance is caused by the die wheel 106 indexing forward in the direction of the arrow 128.

The lock that is cut from the end of the strip is of a dimension in height and arcuate length slightly less than the desired finished dimension of the lock. The lock material is selected, however, to be of a thickness slightly greater than the desired lock material. After the individual lock is cut, it is pressed between opposed pressing surfaces to remove surface flaws and to squeeze the lock to the desired thickness and expand it to the desired dimensions.

As illustrating this step in the process, individual locks are carried forwardly by indexing the die wheel 106 about its supporting shaft 128 until the locks reach a pressing station 130. At the pressing station, a lobe 132, carried on a wheel 133 on a shaft 135 enters the die opening to press the lock between the surface of the die and the outer convex surface of the lobe. As the wheels 106 and 133 index forwardly, the completed lock 134 is ejected from the machine by either being forced off the lobe 132 or out of the die opening or pocket 104.

In summary, a straight strip 64 of material is fed forwardly having a thicker edge 66 and a thinner edge 68. The strip is first edge-bent to a radius R', FIGURE 4, which is smaller than the desired radius at an over-bending location 90. The strip is then released at location 92 to spring outwardly to the correct radius R. The correct radius is equal to the distance between the upper edge 80, FIGURE 3, of a formed conical lock 82 and the intersection of lines 86 and 88 which bisect the material of the lock. The strip 64 is fed forwardly against a deflecting roller 100, FIGURE 4a, and forced downwardly into a curved die surface 108 held into the die surface by a roller 116. The lead end of the material will not form a perfect curvature and is cut at 112 and discarded, FIGURE 4a. The cut is formed with a curved end 114 remaining on the length of material.

Successive locks are then formed by indexing the strip 64 forwardly to curl the material and sequentially form individual locks. The individual locks are cut from the end of the strip in a plane extending through the radial center of the curved lock. Locks are first formed with a length and height of an undersized dimension, but with excess thickness. To complete the locks they are pressed between opposing surfaces to squeeze them to the proper thickness and to the proper linear dimensions.

Thus, it will be seen that I have provided an improved lock and an improved method of manufacturing a valve spring retainer lock which meets the objectives and advantages hereinbefore set forth. With the method, only a first short lead end is lost, and substantially the complete length of material is utilized.

By edge-bending the strip to the proper radius, an axial shifting of material does not occur when the lock is formed and, therefore, the bead within the lock will lie in a plane normal to the axis of curvature of the lock, thus making it possible to obtain the improved lock construction of the present invention. The faces at the ends of the locks are cut along a plane extending through the axial center of the lock, thereby attaining a lock structure providing maximum surface engagement with a valve stem. The completed lock structure obtains an outer surface which lies completely within a conical plane thereby obtaining a perfect and complete surface engagement with the inner surface of the valve spring retainer plate and the inner contacting surface of the valve lock lies completely within a cylindrical plane to obtain maximum surface engagement with the stem of the valve.

I have, in the drawings and specification, presented a detailed disclosure of the preferred embodiment of my invention, and it is to be understood that I do not intend to limit the invention to the specific form disclosed, but intend to cover all modifications, changes and alternative construction and methods falling within the scope of the principles taught by my invention.

I claim as my invention:

1. The method of making a series of valve spring retainer locks which comprises edge-bending a length of flat valve lock material in the plane of the flat material to form a curved arcuate supply strip, thereafter end-bending the end of the curved flat supply strip in an arc extending laterally out of the plane of the flat material to a curvature of the arc of the valve lock with the outer surface of the lock being curled into a conical shape with the top and bottom edges in planes at right angles to the axis of the lock, and cutting locks from the end of the material as it is curled.

2. The process of making valve spring retainer locks which comprises feeding a supply length of tapered flat-surfaced lock material in a forward direction in incremental steps for lengths substantially equal to the circumferential length of a completed valve lock, progressively edge-bending the supply material in the plane of the flat-surfaced material to form a flat arcuate leading end, thereafter progressively curling the end of the edge-bent strip in a conical arc extending laterally of the plane of the strip to form the strip to the curvature of a lock with the top and bottom edges in planes at right angles to the axis of the lock, and cutting individual locks from the end of the material.

3. The process of making valve spring retainer locks comprising forcibly edge-bending an elongated strip of tapered lock material into an arc in the plane of the material with the thinner edge of the tapered material located at the inner side of the arc, to an arc having a radius equal to the distance of the outer edge of a finished lock cone to the intersection of two lines which bisect the material in each side of the cone, thereafter curling the end of the edge-bent material to form a lock cone with the top and bottom edges in planes at right angles to the axis of the lock, and cutting individual locks from the curled end of the material.

4. The method of making valve spring retainer locks which comprises moving a strip of lock material in the form of an elongated flat strip of tapered cross section wth one edge thinner than the other, edge-bending the strip of material to form an arc in the plane of the flat strip with the thinner edge on the inside of the arc and said arc having a radius sharper than the ultimate desired radius, permitting the material to straighten to an arc of the desired radius and retaining the material in said desired arc, thereafter curling the end of the strip in a direction lateral of its plane to form a curl having a cylindrical inner surface and a conical outer surface as the strip is moved, cutting locks from the curled end of the strip of dimensions slightly smaller than the desired linear dimensions of the lock with a thickness larger than the ultimate thickness of the lock, and subsequently applying pressure normal to the curled surfaces of the locks and pressing the locks to the ultimate finished size.

5. The method of making a series of valve spring retainer locks from the end of a flat strip of valve lock material which comprises the steps of over-bending the flat valve lock material in the plane of the material to an arc of a radius smaller than the desired arc, releasing the edge of bent material to spring outwardly to an arc having the desired radius, curling the edge-bent material in a direction lateral of the plane of material to an arc having substantially the radius of a lock, and cutting a lock from the end of the material when it is curled.

6. The method of manufacturing a plurality of valve spring retainer locks from a flat tapered strip of valve lock material which comprises bending the strip of material about its narrower edge and in the plane of the strip of material to shape it to an arcuate form, bending the end of the strip of material laterally to form a curled end of a radius of a desired lock, cutting the end from the curled material and leaving a bent end on the strip, further curling of the bent end of the strip to the radius of a lock, cutting a lock from the curled end and leaving a bent portion on the end of the strip, and pressing the cut lock against its surfaces to reduce its thickness and increase its length and to remove surface defects to form a completed lock.

7. The process of making a series of individual conically shaped valve spring retainer locks which comprises moving a supply strip of lock material forward extending in a flat position and having a tapered thickness with one edge thinner than the other, curling the end of the strip laterally outward from the plane of the strip to form an arcuate curl with the outer surface being conically shaped and the inner surface substantially cylindrically shaped, and cutting individual locks from the curled end as the material is fed forward and curled with each cut being formed to leave a curled end on the supply strip to form the forward end of the next succeeding lock.

8. The process of manufacturing valve spring retainer locks which comprises providing a supply length of tapered flat lock material and moving the material longitudinally and bending it edgewise toward the thinnest edge in the plane in which the material is advanced, forcing the end of the material into a curved arcuate path of the radius of a valve lock at substantially right angles to the direction of edgewise bending with the curvature of the open formed valve lock facing laterally toward the length of material while guiding and supporting the inner surface of the material, and holding the length of material by applying a pressure along a line across the material on the outer surface thereof at a location ahead of the location where it is guided laterally to prevent lateral displacement of the strip as the strip is curved into the arcuate path to form a lock.

9. The method of making valve spring retainer locks which comprises edge-bending a tapered flat-surfaced strip of metal into arcuate shape in a first plane parallel to a flat surface of the strip, thereafter curling the leading end of the strip laterally out of the first plane into a fragmental cylindrical shape, cutting the curled end from the strip, and pressing the curled end into finished lock shape.

10. The method of making valve spring retainer locks which comprises edge-bending a strip of metal into arcuate shape in a first plane, whereafter curling the leading edge of the strip at right angles to the first plane into a fragmental cylindrical shape, and cutting the curled end from the strip.

References Cited in the file of this patent

UNITED STATES PATENTS

| | | |
|---|---|---|
| 1,600,116 | Knoth | Sept. 14, 1926 |
| 1,675,299 | Dawson | June 26, 1928 |
| 1,676,205 | Merrill | July 3, 1928 |
| 1,823,009 | Toaz | Sept. 15, 1931 |
| 1,850,029 | Myers | Mar. 15, 1932 |
| 1,973,227 | Schoenrock | Sept. 11, 1934 |
| 2,037,838 | Van Uum | Apr. 21, 1936 |
| 2,353,925 | Pattison | July 18, 1944 |
| 2,505,128 | MacPherson | Apr. 25, 1950 |
| 2,523,570 | Holdsworth | Sept. 26, 1950 |
| 2,682,387 | Gaddoni | June 29, 1954 |